(12) United States Patent
Toga et al.

(10) Patent No.: US 8,132,459 B2
(45) Date of Patent: Mar. 13, 2012

(54) SYSTEM AND METHOD TO DETERMINE MECHANICAL RESONANCE OF AN ACCELEROMETER

(75) Inventors: Kenji Toga, Meguro (JP); Masaki Yamahsita, Niiza (JP)

(73) Assignee: Texas Instruments Incorporated, Dallas, TX (US)

( * ) Notice: Subject to any disclaimer, the term of this patent is extended or adjusted under 35 U.S.C. 154(b) by 440 days.

(21) Appl. No.: 12/210,187

(22) Filed: Sep. 13, 2008

(65) Prior Publication Data

US 2010/0064809 A1 Mar. 18, 2010

(51) Int. Cl.
*G01P 15/09* (2006.01)
(52) U.S. Cl. ........................ 73/514.34; 73/579
(58) Field of Classification Search ............... 73/514.34, 73/514.16, 514.29, 579
See application file for complete search history.

(56) References Cited

U.S. PATENT DOCUMENTS

| | | | | |
|---|---|---|---|---|
| 5,270,882 A * | 12/1993 | Jove et al. | | 360/67 |
| 5,447,051 A * | 9/1995 | Hanks et al. | | 73/1.15 |
| 5,528,933 A * | 6/1996 | Nemirow | | 73/149 |
| 5,663,847 A | 9/1997 | Abramovitch | | |
| 5,834,930 A * | 11/1998 | Hung et al. | | 324/76.58 |
| 6,060,872 A * | 5/2000 | Ranmuthu | | 323/316 |
| 6,243,186 B1 * | 6/2001 | Melville | | 359/199.1 |
| 6,252,735 B1 * | 6/2001 | Chung et al. | | 360/67 |
| 6,377,110 B1 * | 4/2002 | Cooper | | 327/513 |
| 6,459,327 B1 * | 10/2002 | Yamada et al. | | 327/534 |
| 7,286,314 B2 * | 10/2007 | Baumgart et al. | | 360/75 |
| 7,400,481 B2 * | 7/2008 | Pellon et al. | | 361/93.1 |
| 2010/0245820 A1 * | 9/2010 | Schubert et al. | | 356/335 |

FOREIGN PATENT DOCUMENTS

JP 405301077 * 11/1993

* cited by examiner

*Primary Examiner* — J M Saint Surin
(74) *Attorney, Agent, or Firm* — Dawn V. Stephens; Frederick J. Telecky, Jr.

(57) ABSTRACT

Systems and methods are provided for determining mechanical resonance of a sensor. In one embodiment, a system is provided that comprises a bias voltage source configured to apply a bias voltage impulse signal to a terminal of the sensor and a zero crossing detector configured to detect zero crossing cycles of a sensor output signal response to the bias voltage impulse signal. The system further comprises a controller configured to determine the resonance frequency of the sensor based on the detected zero crossing cycles of the sensor output signal response.

14 Claims, 3 Drawing Sheets

SYSTEM AND METHOD TO DETERMINE MECHANICAL RESONANCE OF AN ACCELEROMETER

TECHNICAL FIELD

This invention relates to electronic circuits, and more specifically to a system and method to determine mechanical resonance of an accelerometer.

BACKGROUND

The head positioning of a hard disk drive is very sensitive against disturbances of shock or vibration. Shocks or vibrations that exceed a certain threshold can introduce off-track writes resulting in data loss. It has been proposed to use accelerometers to sense shock and vibration to the hard disk drive. The accelerometers generate a signal which can be used as a feed forward controller to make the disk drive more robust to shocks and vibrations. There are various methods to compensate the head position and to abort a write operation employing an accelerometer. The accelerometer has mechanical force sensing elements with a mechanical resonance. To sense the shock or vibration correctly during normal operation, the resonance frequency of the accelerometer needs to be determined and filtered out using a low pass filter or a notch filter. Typically, this is accomplished by applying a mechanical hammer shock to the accelerometer, for example, through the body of the disk drive and measuring the response of the accelerometer. The accelerometer response should include the mechanical resonance of the accelerometer, which can be measured by a spectrum analyzer and employed to program the low pass filter or notch filter during manufacturing.

SUMMARY

In accordance with an aspect of the invention, a system is provided for determining mechanical resonance of a sensor. The system comprises a bias voltage source configured to apply a bias voltage impulse signal to a terminal of the sensor and a zero crossing detector configured to detect zero crossing cycles of a sensor output signal response to the bias voltage impulse signal. The system further comprises a controller configured to determine the resonance frequency of the sensor based on the detected zero crossing cycles of the sensor output signal response.

In accordance with another aspect of the invention, a system is provided for determining mechanical resonance of a sensor mounted on a disk drive and monitoring shock and vibration of the disk drive with the sensor. The system comprises means for switching between a test mode for determining the mechanical resonance of the sensor and a normal mode of operation for monitoring shock and vibration of the disk drive. The system further comprises means for applying a bias voltage impulse signal to a terminal of the sensor in the test mode and means for determining a resonance frequency of the sensor based on a sensor output signal response to the bias voltage impulse signal.

In accordance with yet a further aspect of the invention, a method is provided for determining mechanical resonance of a sensor. The method comprises applying a bias voltage impulse signal to a sensor and comparing a sensor output signal response to the bias voltage impulse signal to zero crossing reference voltages to detect zero crossing cycles of the sensor output signal response. The method further comprises determining the resonance frequency of the sensor based on the detected zero crossing cycles over a sample period of time or a time period of a given zero crossing cycle.

DETAILED DESCRIPTION

Figure 1:
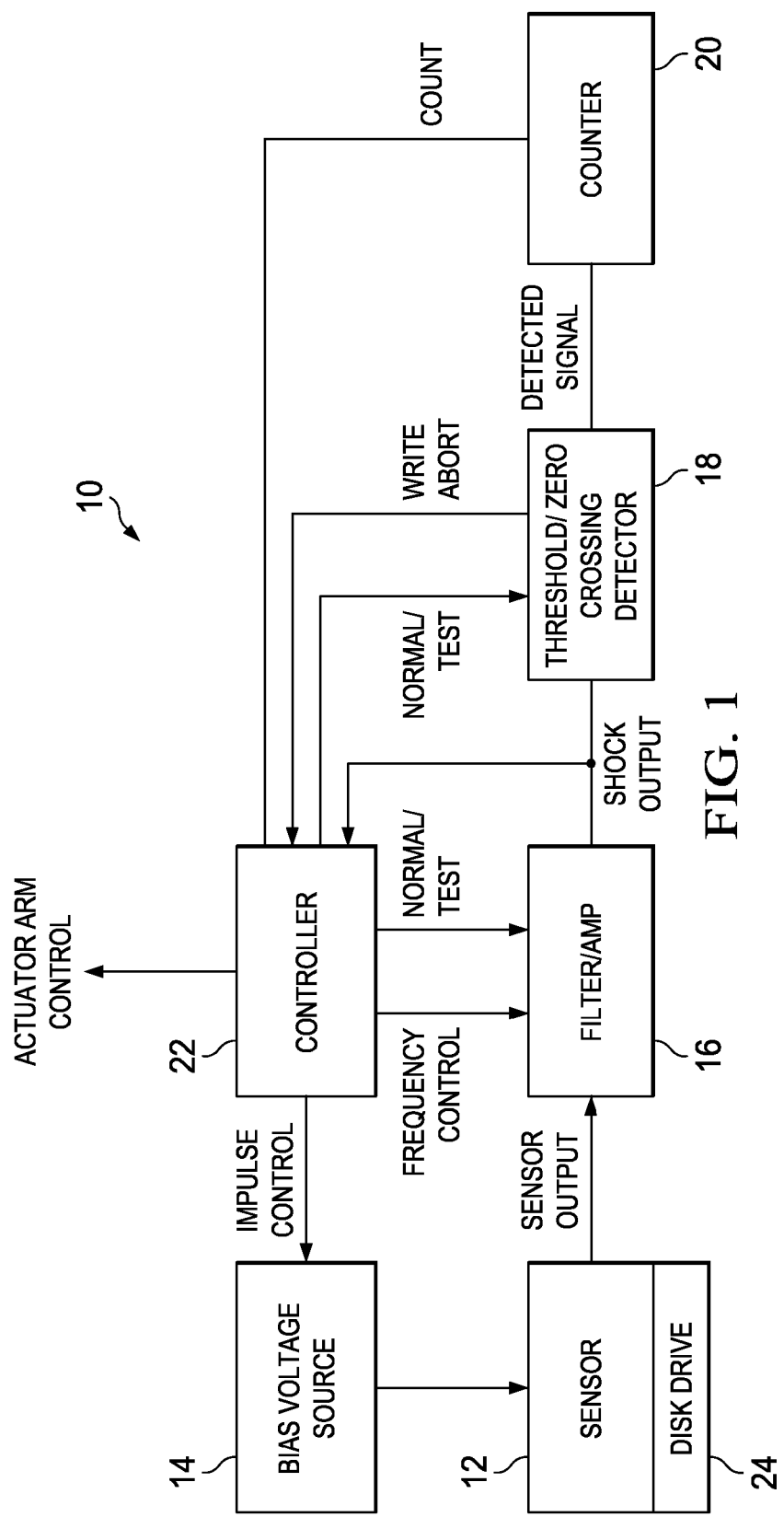
FIG. 1 illustrates a block diagram of system for determining mechanical resonance of a sensor and monitoring shock and vibration to the sensor in accordance with an aspect of the invention.

FIG. 1 illustrates a block diagram of system 10 for determining mechanical resonance of a sensor 12 and monitoring shock and vibration to the sensor 12 in accordance with an aspect of the invention. The sensor 12 can be an accelerometer, such as a piezoelectric accelerometer. The sensor 12 is mounted on a disk drive 24 (e.g., on a disk drive plate) to measure shock and vibration disturbances to the disk drive 24. The system 10 is configured to operate in either a test mode or in a normal mode of operation. In the test mode, the system 10 applies an electrical impulse control signal to the bias of the sensor 12, measures the resonance frequency output of the sensor 12 and programs a low pass filter or notch filter to filter out the resonance frequency. In the normal mode, the system 10 is monitoring shock and vibration to the disk drive 24 to control the positioning of an actuator arm by actuator arm control signals. The system 10 is also monitoring if the measured shock and vibration exceeds a write shock tolerance in which the system 10 instructs the actuator arm to abort a write operation.

As illustrated in FIG. 1, during the test mode, a controller 22 provides an impulse control signal to a bias voltage source 14. The impulse control signal causes the bias voltage source 14 to provide a bias voltage impulse signal to a bias terminal of the sensor 12 simulating a mechanical hammer shock to the disk drive. The output signals of the sensor 12 are provided to a filter/amplifier component 16. The filter/amplifier component 16 amplifies the sensor output signals, which are provided to a programmable filter, which filters out the resonance frequency of the sensor 12 during the normal mode of operation. During the test mode, the programmable filter is bypassed and the filter/amplifier component 16 amplifies the sensor output signal response to the bias voltage impulse signal and provides it to a threshold/zero crossing detector 18. The controller 22 sets the threshold/zero crossing detector 18 to the test mode, which selects the zero crossing detectors. The zero crossing detectors detect zero crossings by the sensor output signal response and provide a detected signal to a counter 20, which toggles between a logic high and a logic low signal for every zero crossing cycle.

In one aspect of the invention, the controller 22 initiates the counter 20 at a beginning of a predetermined sample time period and samples the count of the counter at an end of the predetermined sample time period and determines the resonance frequency of the sensor output signal response to the bias voltage impulse signal based on the sample time period and the count of the counter. In another aspect of the invention, the controller samples the counter values, determines the time for completion of a zero crossing cycle based on a change in count value of the counter and determines the resonant frequency based on the time period of the zero crossing cycle (e.g., transition time between count values). The controller 22 then programs the programmable filter to filter out the determined resonance frequency of the sensor 12. The controller 22 then can switch the system 10 to the normal mode of operation to monitor shock and vibration to the disk drive 24.

Figure 2:
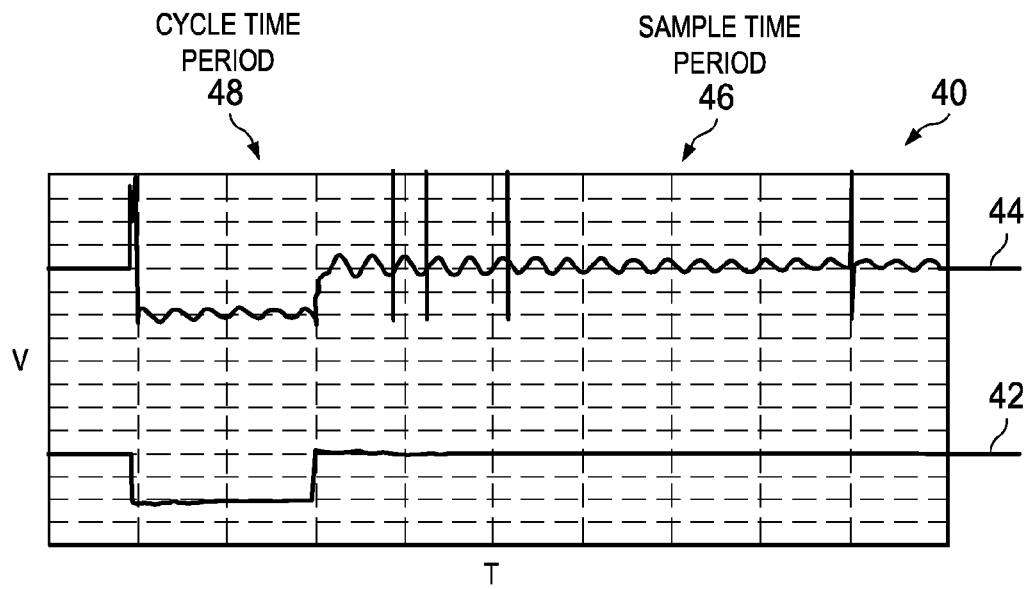
FIG. 2 illustrates a graph of a bias voltage impulse signal and a sensor output signal response to the bias voltage impulse signal in accordance with an aspect of the invention.

FIG. 2 illustrates a graph 40 of a bias voltage impulse signal 42 and a sensor output signal response 44 to the bias voltage impulse signal 42 in accordance with an aspect of the invention. The bias voltage impulse signal 42 as illustrated in FIG. 2 shows a square wave pulse that drops from a sensor bias voltage to ground for a period of time and returns to the bias voltage. It has been determined that the period of time can vary (e.g., 9 us, 18 us, 37 us, 200 us) and still invoke the oscillation of the sensor output signal response 44. It has also been determined that the bias voltage impulse signal 42 can be provided by increasing the bias voltage to a voltage higher than the bias voltage in a normal mode of operation. In one aspect of the invention, a sample time period 46 is employed to initiate and sample the counter 20 for determining the resonance frequency of the sensor 12 of FIG. 1 based on a number of zero crossing cycles over a time period. In another aspect of the invention, a zero crossing cycle time period 48 is determined by monitoring a transition time period between count values of the counter 20.

Referring back to FIG. 1, in the normal mode of operation, a constant bias voltage is applied to the sensor 12. If the sensor experiences vibration or shock, a sensor output signal is provided to the filter/amplifier component 16. The filter/amplifier component 16 amplifies the sensor output signal, which is provided to the programmable filter, which filters out the resonance frequency of the sensor 12 that was determined in the test mode. The filtered signal is amplified and provided as a shock output signal to the threshold/zero crossing detector 18. The controller sets the threshold/zero crossing detector 18 to the normal mode, which selects the threshold detectors. The threshold detectors monitors if the measured shock and vibration exceeds or falls below the write shock tolerance in which the controller 22 instructs the actuator arm to abort the write operation. The shock output signal is also provided to the controller 22, which employs the shock output signal to generate actuator control signals to control the positioning of the actuator arm to compensate for the shock and vibration to the disk drive that does not exceed the write shock tolerance.

Figure 3:
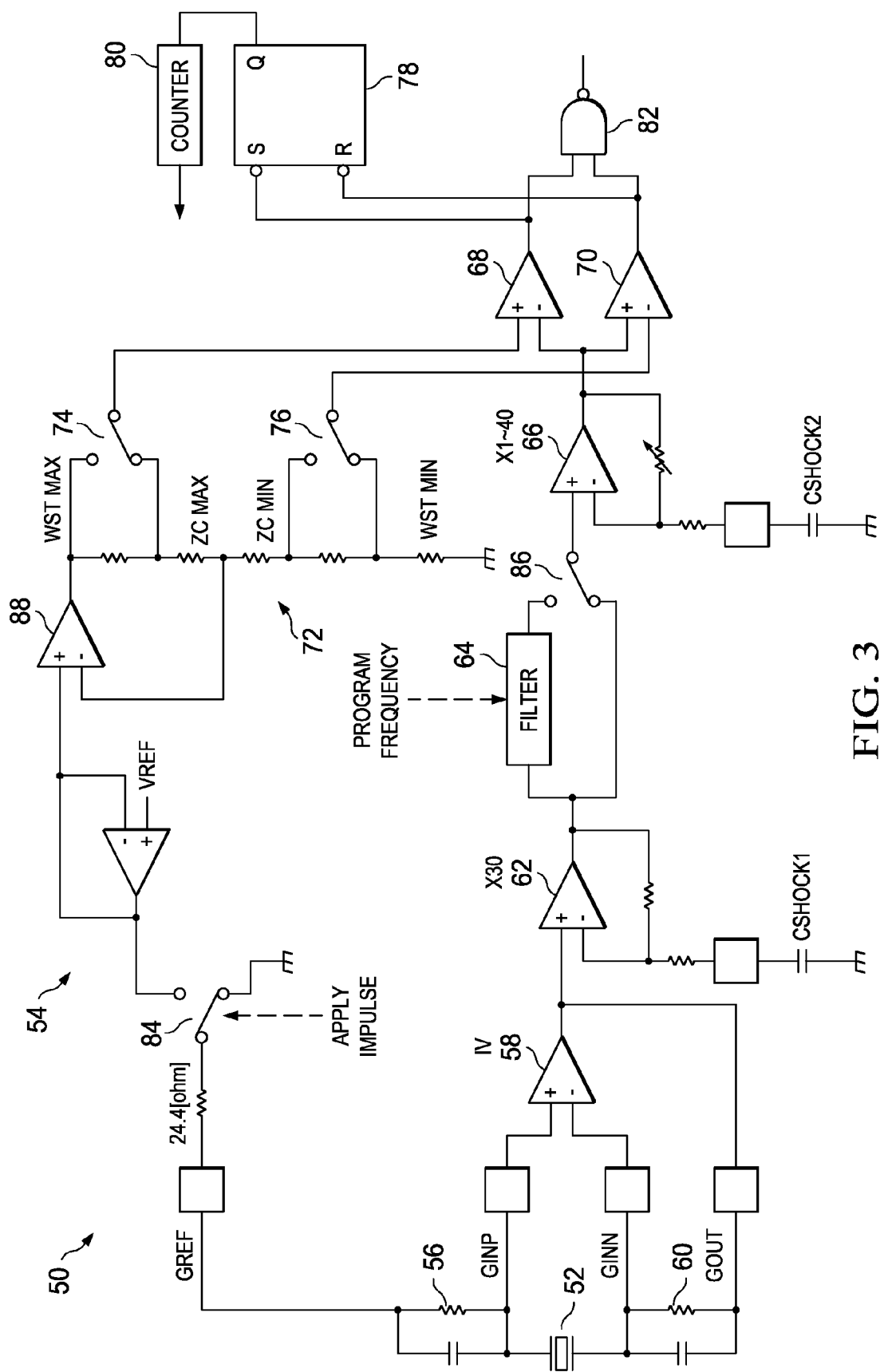
FIG. 3 illustrates a schematic circuit diagram of system or determining mechanical resonance of a sensor and monitoring shock and vibration to the sensor in accordance with an aspect of the invention.

FIG. 3 illustrates a schematic circuit diagram of a system 50 for determining mechanical resonance of a sensor 52 and monitoring shock and vibration to the sensor 52 in accordance with an aspect of the invention. The sensor 52 can be an accelerometer, such as a piezoelectric accelerometer and can be mounted to a disk drive to measure shock and vibration disturbances to the disk drive. A bias voltage VREF is provided at a terminal labeled GREF via an amplifier 54. The bias voltage is provided to a first terminal of the sensor 52 through a first resistor and capacitor pair 56 configured in a parallel arrangement. The first terminal is also coupled to the positive input terminal of a differential amplifier 58. A second terminal of the sensor 52 is coupled to the negative terminal of the differential amplifier 58 and the output of the differential amplifier 58 through a second resistor and capacitor pair 60 configured in a parallel arrangement. The differential amplifier 58 measures the difference between the first terminal and second terminal outputs and provides a sensor output signal, which is reflective of the shock and vibration experienced by the sensor 52.

The output signal of the differential amplifier 58 is provided to a first amplifier 62 to provide an amplified sensor output signal to a programmable filter 64 during a normal mode of operation, which filters out the resonance frequency of the sensor 52. The amplified filtered sensor output signal is then provided to a second amplifier 66 for further amplification. During the test mode, the programmable filter 64 is bypassed via switch 86 with the amplified sensor output signal being provided directly to the second amplifier 66. During the test mode, a controller (not shown) provides an impulse control signal that switches the bias voltage from the reference voltage to ground or to a voltage that is higher than the reference voltage via switch 84 to generate a bias voltage impulse signal to the first terminal of the sensor 52 thus simulating a mechanical hammer shock to the sensor 52. The sensor output signal response of the sensor is amplified by the first and second amplifiers 62 and 64 and provided to a negative input terminal of a first comparator 68 and a positive input terminal of a second comparator 70.

During the test mode, the threshold/zero crossing detector is set to the test mode, which selects providing a zero crossing maximum reference voltage (ZCMAX) to be applied to the positive input terminal of the first comparator 68 and providing a zero crossing minimum reference voltage (ZCMIN) to be applied to the negative input terminal of the second comparator 70. The ZCMAX and ZCMIN are provided from internal nodes of a voltage divider 72 that are set by an amplifier 88 that amplifies the bias reference voltage VREF. The voltage divider 72 also provides a write shock tolerance maximum reference voltage (WSTMax) which is coupleable to the positive input terminal of the first comparator 68 and a write shock tolerance minimum reference voltage (WSTMin), which is coupleable to the negative terminal of the second comparator 70. A pair of switches 74 and 76 select between the write shock tolerance reference voltages in the normal mode and the zero crossing reference voltages in the test mode.

The first and second comparators 68 and 70 provide a detected signal that toggles between a logic high and a logic low signal for every zero crossing. This causes a RS flip flop 78 to set and reset thus providing an output that toggle between a logic high and a logic low for every zero crossing cycle. The counter 80 counts the number of toggles of the RS flip flop 78. In one aspect of the invention, the count of the counter 80 can be sampled during a predetermined sample period to determine the resonance frequency of the sensor output signal response to the bias voltage impulse signal. In another aspect of the invention, the controller can samples the transition time between count values and determines the resonant frequency based on the time period of the zero crossing cycle. The programmable filter 64 can then be programmed to filter out the determined resonance frequency of the sensor 52. The system 50 can then be switched to the normal mode of operation to monitor shock and vibration of the sensor 52.

In the normal mode of operation, a constant bias voltage is applied to the sensor 52 by coupling switch 84 to the output of the amplifier 54. If the sensor experiences vibration or shock, a sensor signal is output from the differential amplifier 58 and provided to the first amplifier 62 to the programmable filter, which filters out the resonance frequency of the sensor. The filtered signal is amplified by the second amplifier 66 and provided as a shock output signal to the negative input terminal of the first comparator 68 and the positive input terminal of the second comparator 70. The pair of switches 74 and 76 select the write shock tolerance reference voltages to be compared to the shock output voltage. If the measured shock and vibration exceeds or falls below the write shock tolerance reference voltages, a write abort signal is output through a nand gate 82, which has inputs coupled to the outputs of the first and second comparator 68 and 70. The write abort signal instructs the actuator arm to abort the write operation. The shock output signal is also provided to a controller, which employs the shock output signal to generate actuator control signals to control the positioning of the actuator arm of a disk drive to compensate for the shock and vibration to the disk drive when it does not exceed the write shock tolerance.

Figure 4:
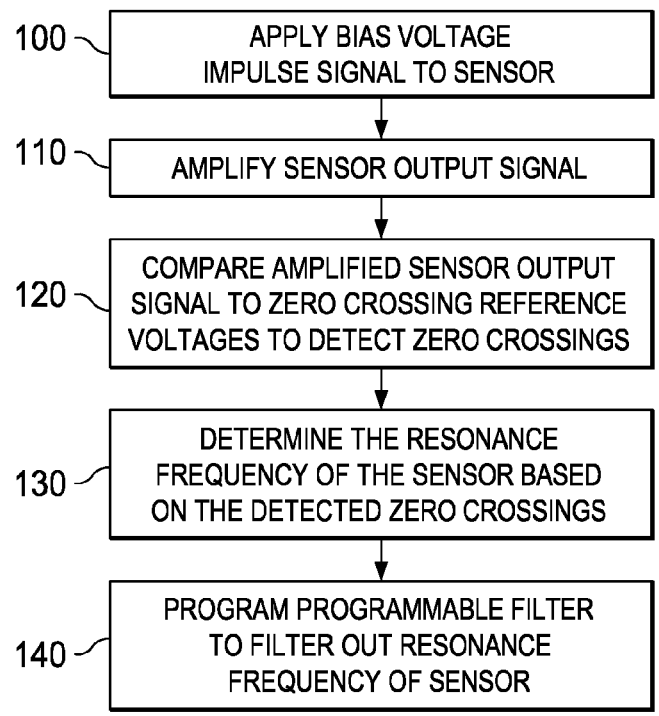
FIG. 4 illustrates a method for determining mechanical resonance of a sensor in accordance with an aspect of the invention.

In view of the foregoing structural and functional features described above, certain methods will be better appreciated with reference to FIG. 4. It is to be understood and appreciated that the illustrated actions, in other embodiments, may occur in different orders and/or concurrently with other actions. Moreover, not all illustrated features may be required to implement a method.

FIG. 4 illustrates a method for determining mechanical resonance of a sensor in accordance with an aspect of the invention. The method begins at 100 wherein a bias voltage impulse signal is applied to a sensor (e.g., piezoelectric accelerometer) mounted on, for example, a hard drive or other device for monitoring shock and/or vibration to a given device. At 110, the sensor output signal response to the bias voltage impulse signal is amplified. At 120, the amplified sensor output signal response is compared to maximum and minimum zero crossing reference voltages to detect the zero crossings. At 130, the resonance frequency of the sensor is determined based on the detected zero crossings. The resonant frequency can be determined based on the number of zero crossing cycles over a given time period or based on a time period of a given zero crossing cycle. At 140, a programmable filter is programmed to filter out the resonance frequency of the sensor for use in a normal mode of operation.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A system for determining mechanical resonance of a sensor, the system comprising:
a bias voltage source configured to apply a bias voltage impulse signal to a terminal of the sensor;
a zero crossing detector configured to detect zero crossing cycles of a sensor output signal response to the bias voltage impulse signal;
a controller configured to determine the resonance frequency of the sensor based on the detected zero crossing cycles of the sensor output signal response; and
a counter that counts the number of zero crossing cycles detected by the zero crossing detector and wherein the controller one of initiates the counter at a beginning of a sample time period of the sensor output signal response and reads the count of the counter at an end of the sample time period to determine the resonance frequency of the sensor or determines a time period of a given zero crossing cycle by determining transition time between count values of the counter to determine the resonance frequency of the sensor.

2. The system of claim 1, wherein system has a test mode for determining the resonance frequency of the sensor and a normal mode for measuring shock and vibration to the sensor.

3. The system of claim 2, wherein the controller is configured to program a programmable filter with the determined resonance frequency to filter out the resonance frequency of the sensor during the normal mode.

4. The system of claim 3, wherein the sensor is mounted to a disk drive.

5. The system of claim 4, wherein the sensor is a piezoelectric accelerometer.

6. The system of claim 1, wherein the zero crossing detector comprises a first comparator that compares the sensor output signal response to a zero crossing maximum voltage reference and a second comparator that compares the sensor output signal response to a zero crossing minimum reference voltage.

7. A system for determining mechanical resonance of a sensor, the system comprising:
a bias voltage source configured to apply a bias voltage impulse signal to a terminal of the sensor;
a zero crossing detector configured to detect zero crossing cycles of a sensor output signal response to the bias voltage impulse signal; and
a controller configured to determine the resonance frequency of the sensor based on the detected zero crossing cycles of the sensor output signal response,
wherein a voltage divider provides the zero crossing maximum and minimum reference voltages derived from a bias reference voltage, the voltage divider further providing a write shock tolerance maximum reference voltage and a write shock tolerance minimum reference voltage wherein switches are selectable between providing the write shock tolerance maximum and minimum reference voltages to the first and second comparator, respectively, to measure if shock and vibration exceeds a write tolerance limit during a normal mode of operation and providing the zero crossing maximum and minimum reference voltages to the first and second comparator during a test mode.

8. The system of claim 7, wherein the outputs of the first and second comparator are coupled to the input of a logic gate which outputs a write abort signal if a sensor output signal is greater than the write shock tolerance maximum reference voltage or less than the write shock tolerance minimum reference voltage in the normal mode, and the outputs of the first and second comparator are coupled to a set and reset terminal of a Flip-Flop which generates a toggle signal in response to the sensor output signal response exceeding the zero crossing maximum reference voltage or falling below the zero crossing minimum reference voltage over a zero crossing cycle in the test mode.

9. The system of claim 8, further comprising a counter that counts the number of toggles of the Flip-Flop and wherein the controller one of initiates the counter at a beginning of a sample time period of the sensor output signal response and reads the count of the counter at an end of the sample time period to determine the resonance frequency of the sensor or determines a time period of a given zero crossing cycle by determining transition time between count values of the counter to determine the resonance frequency of the sensor.

10. A method for determining mechanical resonance of a sensor, the method comprising:
applying a bias voltage impulse signal to a terminal of the sensor;
detecting zero crossing cycles of a sensor output signal in response to the bias voltage impulse signal;

determining a resonance frequency of the sensor based on the detected zero crossing cycles;

counting number of zero crossing cycles detected by the zero crossing detector; and determining a resonance frequency by either initiating a counter at a beginning of a sample time period of the sensor output signal response and reading the count of the counter at an end of the sample time period, or determining a time period of a given zero crossing cycle by determining transition time between count values of the counter.

11. The method of claim 10, wherein the sensor is an accelerometer mounted to a hard drive to monitor shock and vibration to the hard drive during a normal mode of operation.

12. The method of claim 11, further comprising programming a programmable filter to filter out the resonance frequency of the sensor during the normal mode of the sensor.

13. The method of claim 12, further comprising comparing sensor output signals to write shock tolerance reference voltages to determine if a shock or vibration to the hard drive has exceed a write tolerance limit and aborting a write operation if the sensor output indicate that the shock or vibration to the hard drive has exceeded a write tolerance limit.

14. The method of claim 11, further comprising adjusting an actuator arm of the hard drive to compensate for vibration and/or shock to the hard drive based on the sensor output signals that do not provide an indication that the shock or vibration to the hard drive has exceeded a write tolerance limit.

* * * * *